United States Patent [19]

Buan

[11] 4,209,042
[45] Jun. 24, 1980

[54] HOSE

[75] Inventor: Angeles V. Buan, Waukegan, Ill.

[73] Assignee: The Goodyear Tire & Rubber Company, Akron, Ohio

[21] Appl. No.: 917,824

[22] Filed: Jun. 22, 1978

[51] Int. Cl.² .............................................. F16L 11/08
[52] U.S. Cl. ...................................... 138/126; 138/125; 138/141; 138/DIG. 1; 156/335
[58] Field of Search ............... 138/125, 126, 127, 137, 138/141, DIG. 1; 526/7; 156/335; 264/29.3; 428/36

[56] References Cited

U.S. PATENT DOCUMENTS

| | | | |
|---|---|---|---|
| 2,138,889 | 12/1937 | Smith et al. | 260/33.2 R X |
| 2,227,983 | 1/1941 | Smith | 260/33.2 R |
| 2,442,018 | 5/1948 | Quarles | 260/33.2 R |
| 2,610,910 | 9/1952 | Thomson | 138/DIG. 1 |
| 3,101,991 | 8/1963 | Fukushima et al. | 526/7 X |
| 3,166,099 | 1/1965 | Wolfe | 138/125 X |
| 4,124,554 | 11/1978 | Fry | 260/29.3 |
| 4,126,597 | 11/1978 | Walrath et al. | 156/335 X |

FOREIGN PATENT DOCUMENTS 1188388  3/1965  Fed. Rep. of Germany ........... 138/127

*Primary Examiner*—Richard E. Aegerter
*Assistant Examiner*—James E. Bryant, III
*Attorney, Agent, or Firm*—J. D. Wolfe

[57] ABSTRACT

A fluid adhesive composed of phenol formaldehyde resin and sufficient di(alkyl Carbitol) formal, where the alkyl radical contains from 1 to about 12 carbon atoms and yields a fluid composition, this fluid composition permits an elastomeric hose having an innertube of nylon to be adhered to a sulfur curable elastomer. This is reinforced by textile braid and covered with suitable Neoprene cover. This hose is suitable as a pressure hose in refrigeration or automotive uses.

3 Claims, 1 Drawing Figure

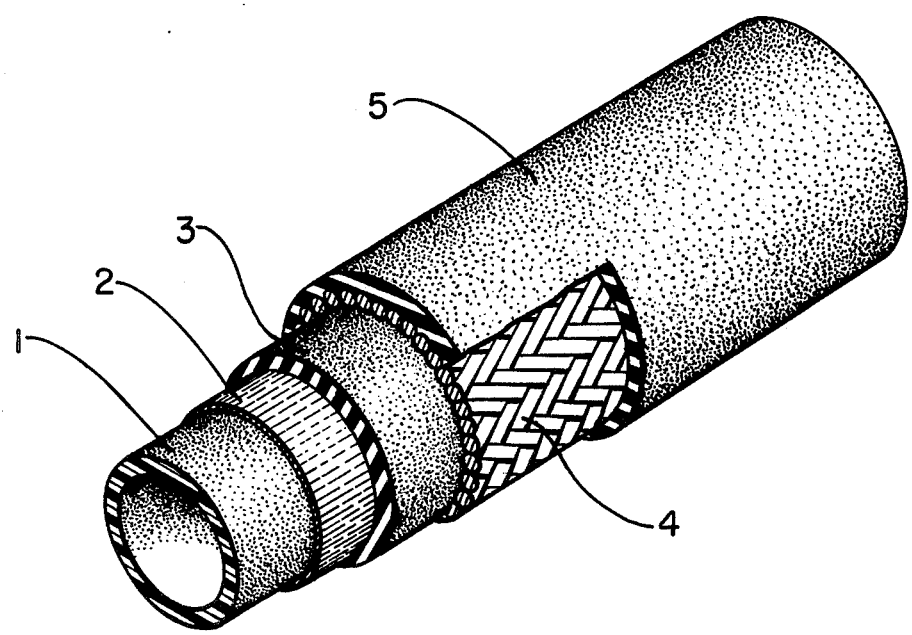

HOSE

This invention relates to an improved reinforced elastomeric hose and more particularly, it relates to a reinforced elastomeric hose having a nylon innerliner which has been adhered to the outer rubber member in an improved manner. Specifically, this invention relates to an adhesive for adhering the nylon tube to the outer elastomeric friction layer of said hose.

Elastomeric hose for use on paint sprayers and for handling special chemicals such as the chlorofluorohydrocarbons have conventionally been made with a nylon innertube, having a covering of a tube of a second rubber which has braided thereabout fabric which preferably is a textile yarn to give the hose burst strength. Generally this type of hose has been made by extruding a compounded nylon or polyamide resin as a tube and then passing the nylon tube through an adhesive station to coat the nylon tube with an adhesive. A textile yarn was braided over the coated nylon tube before the tube was passed through an apparatus such as a modified extruder head to have extruded thereon a covering of a suitable rubber. This composite was cured to produce the hose. In some instances, it is preferred to apply a special chemical resistant rubber, for instance, Neoprene, also called polychloroprene, to give the hose special chemical properties. Heretofore, when the hose was placed under pressure and then depressurized as in use, there was a strong tendency for the nylon inner tube to separate from the outer tube of other rubber because the adhesive bond failed.

This invention provides a novel adhesive which gives a superior bond between the nylon and the other rubbers or elastomers to reduce ply separation and hose failure. Thus this invention provides an improved hose.

The nature of this invention can more readily be understood by reference to the drawing wherein numeral 1 represents an extruded nylon tube and numeral 2 represents a coating of adhesive on the outside of said nylon tube. Numeral 3 represents a friction layer of nitrile rubber and numeral 4 represents the textile yarn braided around the nylon rubber tube. The fabric yarn, preferably a textile yarn, can be a polyester, a polyamide and other well known reinforcing yarns or materials used in making reinforced hose. Numeral 5 represents a Neoprene covering that may be applied to give the hose special solvent resistance.

The nylon used preferably is an extrusion grade plasticized polyamide of the Nylon 11 type, or an extrusion copolymer nylon (Zytel 91). In general, the polyamides, which preferably have been dried overnight at 60° C. can be extruded at temperatures between 230° C. and 250° C. under 5000 to 5500 pounds per square inch pressure to give a satisfactory tube of the desired diameter, usually about one-fourth to one inch in diameter.

The extruded nylon tube is coated with an adhesive prepared by blending 100 parts by weight of a phenol-formaldehyde resin with 60 to 150, and preferably 80 to 120 parts of di(butyl carbitol) formal. Preferably the phenol formaldehyde resin is dissolved in sufficient methylethyl ketone to produce a solution containing about 64 percent by weight of solids. This solution can be blended more readily with the di(butyl carbitol) formal to give a fluid adhesive. The blend of the above materials preferably gives a material which is slightly viscous to a relatively thick liquid and can be spread or applied to the surface of the nylon tube very readily. A preferred method of coating the nylon tube with this adhesive is to pass the nylon tube through a container of said fluid adhesive and then as the hose is pulled from the container it passes through a swabbing station to wipe off all the excess adhesive to just leave a thin coating of less than one mil on the nylon tube.

This adhesive coated nylon tube is passed through an extruder head where a butadiene nitrile rubber suitably compounded is extruded onto the nylon tube as friction layer. The tube is braided with a textile yarn such as a polyester filament for reinforcement. Then the textile braided hose is preferably covered with a suitable Neoprene stock to give it a chemical resistant covering. Also, chloroprene/styrene butadiene blends are desired for cover stock. The hose is preferably cured by holding the braided hose at 148° C. for 60 minutes and a pressure of 60 pounds per square inch.

Although any of the sulfur curable elastomers can be used as a friction stock, rubbers such as styrene butadiene rubber containing sulfur as curatives can be used, too. Nitrile rubber, or butadiene/acrylonitrile blends are preferred as they yield adhesion strengths of from 10 to greater than 40 pounds per inch adhesion.

Instead of butadiene/acrylonitrile rubber, other rubbers can be used as friction layer over the nylon tube. For example, blends of acrylonitrile-butadiene rubber, styrene-butadiene rubber and polyvinyl chloride can be used, too. Usually these rubbers and blends are compounded with a curative such as 0.5 to 1.5 percent of sulfur or sulfur with benzothiazyl disulfide and tetramethylthiuram to give a satisfactory cured stock. Fillers such as carbon black, clays and silicas can be used to advantage along with the customary plasticizers.

In summary, the adhesive of this invention is a fluid mixture of a phenol-formaldehyde resin with a di(alkyl carbitol) formal where the alkyl radical contains from 1 to about 12 carbon atoms, with the preferred alkyl radicals being those from butyl to 2-ethylhexyl. In some instances, the ketones can be used to advantage in adjusting the viscosity of the adhesive to give it good spreading and application properties.

While certain representative embodiments and details have been shown for the purpose of illustrating the invention, it will be apparent to those skilled in this art that various changes and modifications may be made therein without departing from the spirit or scope of the invention.

What is claimed is:

1. An elastomeric hose having an inner tube of nylon adhered with an adhesive to an outer layer of textile reinforced sulfur curable elastomer, said adhesive being composed of a mixture of phenol-formaldehyde resin and di(alkyl carbitol) formal where the alkyl radical contains from 1 to 12 carbon atoms.

2. The hose of claim 1 wherein the reinforcing is polyester and the sulfur curable elastomer is a copolymer of acrylonitrile butadiene.

3. The hose of claim 1 wherein the outer layer has a covering of chloroprene/styrene butadiene rubber.

* * * * *